(12) United States Patent
Kitajima

(10) Patent No.: US 10,521,219 B2
(45) Date of Patent: Dec. 31, 2019

(54) UPDATE PROCESSING METHOD, UPDATE PROCESSING APPARATUS, AND RECORDING MEDIUM

(71) Applicant: FUJITSU LIMITED, Kawasaki-shi, Kanagawa (JP)

(72) Inventor: Shinya Kitajima, Shinagawa (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/956,243

(22) Filed: Apr. 18, 2018

(65) Prior Publication Data

US 2018/0307476 A1    Oct. 25, 2018

(30) Foreign Application Priority Data

Apr. 20, 2017   (JP) ................................. 2017-083982

(51) Int. Cl.
| | | |
|---|---|---|
| *G06F 8/65* | (2018.01) | |
| *G06F 9/54* | (2006.01) | |
| *H04L 29/08* | (2006.01) | |

(52) U.S. Cl.
CPC ................. *G06F 8/65* (2013.01); *G06F 9/54* (2013.01); *H04L 67/02* (2013.01)

(58) Field of Classification Search
CPC ........... G06F 9/54; G06F 8/65; H04L 67/2842
USPC ....................................................... 717/168
See application file for complete search history.

(56) References Cited

U.S. PATENT DOCUMENTS

| 4,525,780 A   * | 6/1985 | Bratt et al. ................ G06F 9/54 |
| | | 711/163 |
| 2010/0180271 A1* | 7/2010 | Arsenault et al. ........ G06F 8/65 |
| | | 717/168 |

FOREIGN PATENT DOCUMENTS

| JP | 2009-042829 | 2/2009 |
| JP | 2013-105227 | 5/2013 |
| JP | 2016-538669 | 12/2016 |
| WO | 2015/051184 | 4/2015 |

* cited by examiner

*Primary Examiner* — Wei Y Zhen
*Assistant Examiner* — Mohammed N Huda
(74) *Attorney, Agent, or Firm* — Fujitsu Patent Center

(57) ABSTRACT

An update processing method executed by a processor included in an update processing apparatus, the update processing method includes storing, in a memory, update information that is updated in accordance with update processing executed by using information called from another computer in accordance with accepted request information, the update information regarding a frequency of the call, and response information that is used for response to the request information; when the request information corresponding to the update processing is accepted, determining in accordance with the update information whether to transmit the response information stored in the memory as a response to the request information to a transmission source of the request information; and transmitting the response information selected in accordance with a result of the determination to the transmission source.

12 Claims, 21 Drawing Sheets

FIG. 4

| 1st API | 2nd API | NUMBER OF COMBINATION CALLS | NUMBER OF 1ST API CALLS |
|---|---|---|---|
| A-SYSTEM API2 | A-SYSTEM API 5 | 126 | 263 |
| | A-SYSTEM API 6 | 126 | |
| | A-SYSTEM API 12 | 126 | |
| | ... | ... | |
| ... | ... | ... | ... |

FIG. 5

| REFERENCE API | REFERENCE API UNIQUE ID FIELD | REMAINING ITEM NUMBER FIELD | NO REMAINING ITEMS VALUE | UPDATE API | UPDATE API UNIQUE ID FIELD |
|---|---|---|---|---|---|
| A-SYSTEM API 2 | /items[]/item/availability | /items[]/item/availability | 1 | A-SYSTEM API 5 | isbn |
| B-SYSTEM API 3 | /hotels[]/hotel/planid | – | – | B-SYSTEM API 9 | planid |
| C-SYSTEM API 1 | /shopId/itemID | /shopId/invCnt | 0 | C-SYSTEM API 6 | itemID |
| ... | ... | ... | ... | ... | ... |

FIG. 6

| REFERENCE API | FIELD | VALUE | NUMBER OF UPDATE API CALLS | NUMBER OF UPDATE API NON-CALLS |
|---|---|---|---|---|
| A-SYSTEM API 2 | /items[]/item/availability | 1 | 2 | 25 |
| | | 2 | 56 | 10 |
| | | 3 | 34 | 2 |
| | /items[]/item/isbn | 978-4-XX-YY | 1 | 2 |
| | | 978-4-XX-ZZ | 0 | 1 |
| | | ⋮ | ⋮ | ⋮ |
| | /items[]/item/itemPrice | 1400 | 2 | 1 |
| | | 1512 | 0 | 2 |
| | | ⋮ | ⋮ | ⋮ |
| | ⋮ | ⋮ | ⋮ | ⋮ |
| ⋮ | | | | |

FIG. 7

```
<userId>22210</userId>
<applicationId>12645215</applicationId>
<token>XXXXX</token>
<order>
   <items>
      <item>
         <isbn>978-4-XX-YYYYYY-Z</isbn>
      </item>
   </items>
</order>
```

FIG. 8

```
<items>
   <item>
      <isbn>978-4-XX-YYYYYY-Z</isbn>
      <availability>1</availability>
      <title>TITLE A</title>
      <author>AUTHOR A</author>
      <publisher>A BOOKSTORE</publisher>
      <price>XXX YEN</price>
      <url>www.x x x x .ne.jp/detail?searchCode=00000001</url>
   </item>
</items>
```

FIG. 10

| REFERENCE API | UNIQUE ID | VALUE OF REMAINING ITEMS | SHORTEST AMOUNT OF TIME (min) |
|---|---|---|---|
| A-SYSTEM API2 | 978-4-XX-YY | 3 | 20 |
| A-SYSTEM API2 | 978-4-XX-YY | 2 | 0 |
| ... | ... | ... | ... |

FIG. 11

| REFERENCE API | UNIQUE ID | VALUE OF REMAINING ITEMS | SHORTEST AMOUNT OF TIME (min) |
|---|---|---|---|
| A-SYSTEM API2 | 978-4-XX-YY | 3 | 11:00:00 |
| A-SYSTEM API2 | 978-4-XX-YY | 2 | 10:59:30 |
| ... | ... | ... | ... |

FIG. 12

PURCHASE IS COMPLETE

UPDATE PROCESSING METHOD, UPDATE PROCESSING APPARATUS, AND RECORDING MEDIUM

CROSS-REFERENCE TO RELATED APPLICATION

This application is based upon and claims the benefit of priority of the prior Japanese Patent Application No. 2017-83982, filed on Apr. 20, 2017, the entire contents of which are incorporated herein by reference.

FIELD

The embodiment discussed herein is related to an update processing method, an update processing apparatus, and a storage medium.

BACKGROUND

A network system including a Web client, a Web server, and a plurality of Web proxy servers that, acting on behalf of the Web server, respond to the Web client with cached data has been proposed. In such a network system, based on past response times of transmitting and receiving cached data between the Web client and each Web proxy server, a Web proxy server with the shortest response time is selected and a response with cached data is made.

A technique has been proposed to invalidate cached data by using tokens in an information processing system including a plurality of proxy servers that retain cached data.

An information providing system has been proposed that provides an information network with session information within a communication network. As related art, for example, Japanese Laid-open Patent Publication No. 2013-105227, Japanese National Publication of International Patent Application No. 2016-538669, and Japanese Laid-open Patent Publication No. 2009-042829 are disclosed.

In communication between the Web client and the Web server, the technique using cached data mentioned above may improve the response performance for reference processing. In the above-mentioned technique using cached data, however, for update processing, although invalidating cached data is taken into account, improving the response performance by using cached data is not taken into account. In view of the above, it is desirable that the response performance in update processing may be improved.

SUMMARY

According to an aspect of the invention, an update processing method executed by a processor included in an update processing apparatus, the update processing method includes storing, in a memory, update information that is updated in accordance with update processing executed by using information called from another computer in accordance with accepted request information, the update information regarding a frequency of the call, and response information that is used for response to the request information; when the request information corresponding to the update processing is accepted, determining in accordance with the update information whether to transmit the response information stored in the memory as a response to the request information to a transmission source of the request information; and transmitting the response information selected in accordance with a result of the determination to the transmission source.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a combination database (DB);

FIG. 5 is a diagram illustrating an example of an association DB;

FIG. 6 is a diagram illustrating an example of an identification DB;

FIG. 7 is a diagram illustrating an example of request information corresponding to update processing;

FIG. 8 is a diagram illustrating an example of a result of performing reference processing;

FIG. 10 is a diagram illustrating an example of a shortest amount of time DB;

FIG. 11 is a diagram illustrating an example of an update information DB;

FIG. 12 is a diagram illustrating an example of response information stored in a response information DB;

DESCRIPTION OF EMBODIMENT

Hereinafter, an example of an embodiment of the disclosed techniques will be described in detail with reference to the accompanying drawings. Hereinafter, an example of an embodiment in which the disclosed techniques are applied to a Web system using a protocol such as the hypertext transfer protocol (HTTP) will be described.

Figure 1:
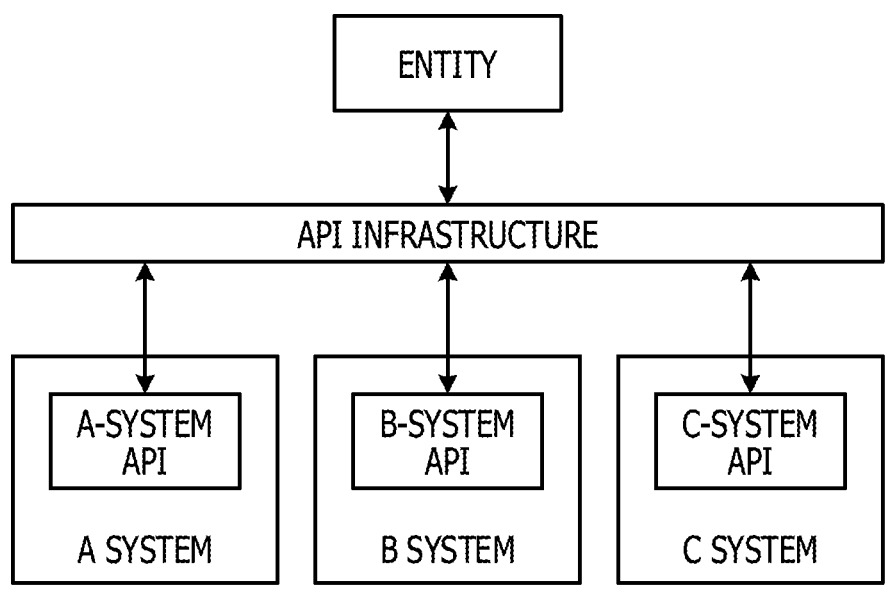
FIG. 1 is a block diagram illustrating a Web system using an API infrastructure.

First, issues of update processing in the Web system will be described before the description of details of the embodiment. A mashup, which combines a plurality of different functions together to provide a new service, is performed. In a mashup, as illustrated in FIG. 1 by way of example, an entity providing a service uses an application programming interface (API) infrastructure in which APIs for the respective services provided by a plurality of different systems are registered. The entity uses the API infrastructure, thereby using the APIs for services in combination to provide a new service. The entity uses the API infrastructure, thereby being able to use additional functions such as a function of referencing the number of calls for each API provided by the API infrastructure, a function of referencing the response time of each API, an authentication function, and a cache function.

Figure 2:
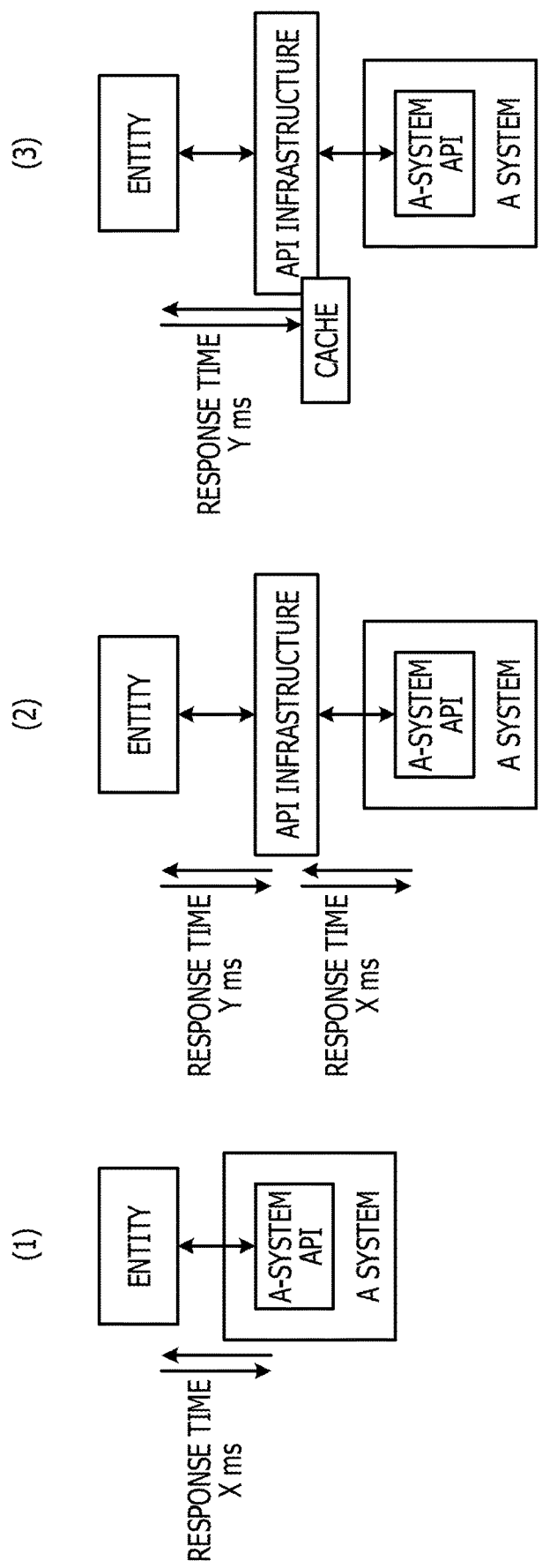
FIG. 2 includes block diagrams illustrating response times in the Web system, in which the diagram in (1) illustrates the case where no API infrastructure is used, the diagram in (2) illustrates the case where an API infrastructure is used and the API infrastructure does not have a cache function, and the diagram in (3) illustrates the case where an API infrastructure is used and the API infrastructure has a cache function.

With reference to FIG. 2, for example, the case where an entity uses the service of a system A by using an API provided by the system A will be described. The diagram in (1) illustrates the case where the entity directly uses the service of the system A. The diagram in (2) illustrates the case where the entity uses the service of the system A via an API infrastructure and where the API infrastructure does not have a cache function. The diagram in (3) illustrates the case where the entity uses the service of the system A via the API infrastructure and where the API infrastructure has a cache function.

As illustrated in (2) by way of example, when the entity uses the service of the system A via the API infrastructure, the response time increases by an amount of time taken to pass through the API infrastructure compared to the case where the entity directly uses the service of the system A as illustrated in (1). The term "response time", as used herein, refers to the amount of time taken from the time at which an entity transmits request information indicative of a request for processing to be performed to the time at which the entity receives response information indicative of a response to the request information.

In order to reduce the response time taken when an entity uses the service of the system A via the API infrastructure, it is conceivable for the API infrastructure to retain cached data as illustrated in (3) by way of example. That is, the API infrastructure retains, as cached data, response information provided by the system A and makes a response with the cached data to request information transmitted from the entity, thereby allowing the response time to be reduced.

With this approach in which a response with cached data is made, the response time may be reduced for reference processing in which information retained by the system A is referenced without being updated (hereinafter simply referred to as "reference processing"). However, for update processing in which information retained by the system A is updated (hereinafter simply referred to as "update processing"), there is a possibility that cached data will be inconsistent with information retained by the system A, and therefore a response with cached data is not able to be returned. As a result, for update processing, it may not be possible to reduce the response time. Accordingly, the present embodiment provides techniques to improve the response performance in the update processing.

Next, with reference to FIG. 3, the functional configuration of an update processing apparatus 10 according to the present embodiment will be described. The update processing apparatus 10 is an apparatus that implements the API infrastructure described above. The update processing apparatus 10 is an information processing apparatus of, for example, a personal computer, a server computer, and the like.

Figure 3:
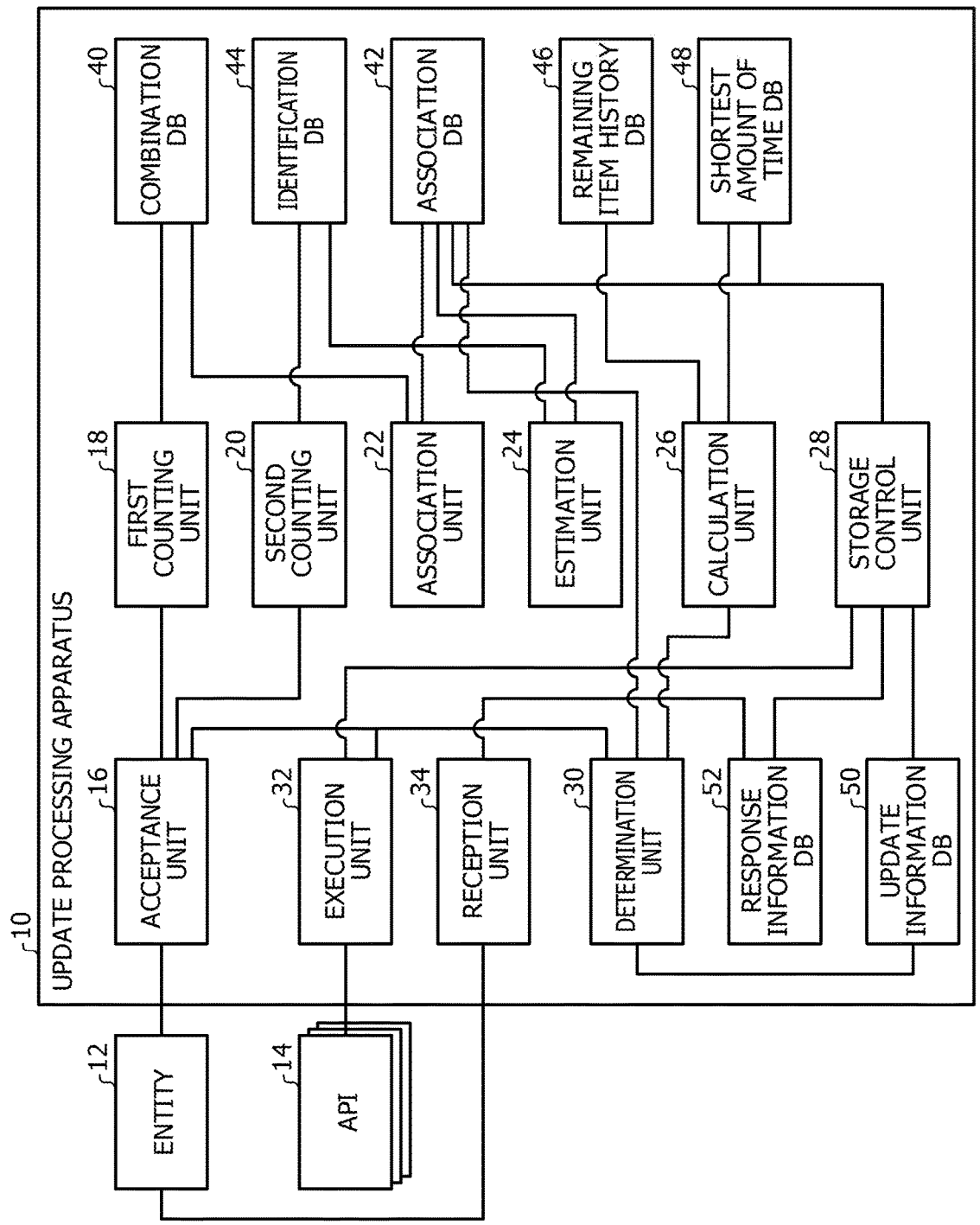
FIG. 3 is a functional block diagram of an update processing apparatus according to an embodiment.

As illustrated in FIG. 3, the update processing apparatus 10 includes an acceptance unit 16, a first counting unit 18, a second counting unit 20, an association unit 22, an estimation unit 24, a calculation unit 26, a storage control unit 28, a determination unit 30 an execution unit 32, and a response unit 34. In a predetermined area of the update processing apparatus 10, a combination database (DB) 40, an association DB 42, an identification DB 44, a remaining item history DB 46, a shortest amount of time DB 48, an update information DB 50, and a response information DB 52 are stored. Upon accepting request information indicative of a request from the entity 12, the update processing apparatus 10 calls an API 14 in accordance with the request of the respective APIs 14 provided by a plurality of different systems and thus performs processing in accordance with the request. The update processing apparatus 10 then transmits response information in accordance with the request information to the entity 12. Hereinafter, the API 14 used when reference processing such as search processing is performed is referred to as a "reference API". Further, the API 14 used when update processing of a process of purchasing goods, a process of making a vehicle seat reservation, a process of making a reservation of a room of accommodation, or the like is performed is referred to as an "update API".

FIG. 4 illustrates an example of the combination DB 40. The combination DB 40 is a DB used in order to, when a reference API is called, associate the called reference API with an update API that is to be called corresponding to the reference API. Examples of the case where the update API is called corresponding to the reference API include processing in which after search for goods has been performed, goods obtained by the search are purchased. Examples of the search processing include processing in which goods are searched for by using identification information that uniquely identifies goods, such that the goods are identified, and processing in which target goods are selected from a plurality of goods displayed as a list by a keyword search or the like.

As illustrated in FIG. 4, a 1st API, a 2nd API, the number of combination calls, and the number of 1st API calls are stored in the combination DB 40. In the 1st API column, information identifying a reference API is stored. In the 2nd API column, information identifying an update API is stored. In the number of combination calls column, the number of times an update API stored in the 2nd API column is called within a predetermined period (for example, 10 seconds or less) after a reference API stored in the 1st API column has been called is stored. In the number of 1st API calls column, the number of times a reference API stored in the 1st API column is called is stored.

FIG. 5 illustrates an example of the association DB 42. The association DB 42 is a DB in which information on reference APIs and update APIs associated with each other is stored. As illustrated in FIG. 5, in the association DB 42, a reference API, the unique identifier (ID) field of a reference API, a remaining item number field, the value of no remaining items, an update API, and the unique ID field of an update API are stored. In the reference API column, information identifying a reference API is stored. In the update API column, information identifying an update API is stored. Information stored in the reference API unique ID field column, the remaining item number field column, the no remaining items value column, and the update API unique ID field column will be described below.

FIG. 6 illustrates an example of the identification DB 44. The identification DB 44 is a DB used for identifying information to be stored in the no remaining items value column of the reference API in the association DB 42. As illustrated in FIG. 6, in the identification DB 44, a reference API, a field, a value, the number of calls of an update API, and the number of non-calls of an update API are stored. In the reference API column, information identifying a reference API is stored. Information to be stored in the field column, the value column, the number of update API calls column, and the number of update API non-calls column will be described below.

The acceptance unit 16 accepts request information transmitted from the entity 12. FIG. 7 illustrates an example of request information. In FIG. 7, an example of request information corresponding to update processing is illustrated. As illustrated in FIG. 7, a plurality of combinations (so-called fields) of values (for example, "22210") and names corresponding to the values (for example, "userId") are included in request information according to the present embodiment. In the present embodiment, the case is described where a data format corresponding to JavaScript (registered trademark) Object Notation (JSON) is applied as the data format of request information; however, the data format of request information is not limited to this. For example, another structured data format such as extensible markup language (XML) may be applied as a data format of request information.

As illustrated in FIG. 7, the request information includes identification information (the "isbn" field in the example in FIG. 7) that identifies goods to be processed, such as a book and a vehicle seat. In the present embodiment, the request information includes an ID (the "applicationId" field in the example in FIG. 7) for identifying an application of the transmission source of the request information. In the present embodiment, an API 14 to be executed in accordance with request information may be identified by the value ("12645215" in the example in FIG. 7) of the "applicationId" field of the request information. That is, it may be determined by the value of "applicationId" of the request information whether the processing to be performed in accordance with the request information is reference processing or update processing.

When a reference API is called in accordance with request information accepted by the acceptance unit 16, the first counting unit 18 adds one to the value of the number of 1st API calls column corresponding to the reference API in the combination DB 40. When an update API is called within the predetermined period after the reference API has been called, the first counting unit 18 adds one to the value of the number of combination calls column corresponding to the combination of the called reference API and update API in the combination DB 40.

When a reference API is called in accordance with request information accepted by the acceptance unit 16, the second counting unit 20 updates the identification DB 44 according to an execution result of the reference API. FIG. 8 illustrates an example of an execution result of a reference API that executes search processing. As illustrated in FIG. 8, the execution result of the reference API according to the present embodiment includes a combination of a value (for example, "title A") and a name corresponding to the value (for example, "title"), as is the case with the request information mentioned above. In the example in FIG. 8, the "isbn" field is a field that uniquely identifies a search target.

In addition, the "availability" field is a field representing the number of remaining items (for example, the amount of stock) of the search target. The value of the field representing the number of remaining items varies depending on a service for which the reference API is provided. For example, the case is considered where the field value is binary, indicating whether there are no remaining items or there are remaining items. Alternatively, the three-valued case is considered, indicating whether the number of remaining items is greater than or equal to a certain value, the number of remaining items is greater than or equal to one and less than the certain value (a small quantity of stock), or there are no remaining items.

In the present embodiment, when a reference API is called, the second counting unit 20 performs processing described below for each field included in an execution result of the reference API. That is, in this case, if an update API associated with the reference API is called within the predetermined period after the reference API has been called, the second counting unit 20 adds one to the value of the number of update API calls column in the identification DB 44 corresponding to the value of each field. If the update API is not called within the predetermined period after the reference API has been called, the second counting unit 20 adds one to the value of the number of update API non-calls column in the identification DB 44 corresponding to the value of each field.

The association unit 22 references the combination DB 40 and stores a reference API and an update API in association with each other in the association DB 42. In the present embodiment, for a reference API for which the value of the number of 1st API calls column stored in the combination DB 40 is greater than or equal to a predetermined value, the association unit 22 performs processing described below. That is, in this case, the association unit 22 stores the reference API and an update API having the largest value in the number of combination calls column, among update APIs stored in the 2nd API column corresponding to the reference API, in association with each other in the association DB 42.

The estimation unit 24 estimates that a field whose value in an execution result of the reference API varies between the case where the update API associated with the reference API is called within the predetermined period after the reference API has been called and the case where this update API is not called within such a period is a field described below. That is, in this case, the estimation unit 24 estimates the field with a varying value to be a field in which the number of remaining items is to be stored (hereinafter referred to as a remaining item number field). This is because when calling a reference API results in that there are no remaining items, it is estimated that an update API will not be called corresponding to the reference API. The estimation unit 24 then stores a path identifying the estimated remaining item number field in the remaining item number field column corresponding to the reference API in the association DB 42. In the present embodiment, in order to be used for estimation of the remaining item number field made by the estimation unit 24, information, which indicates whether the update API is called within the predetermined period after the reference API has been called, and an execution result of the reference API are temporarily stored in a given storage area of the update processing apparatus 10.

The estimation unit 24 references the identification DB 44 and stores a value in the no remaining items value column corresponding to the reference API in the association DB 42.

In the present embodiment, for the remaining item number field for which the total values of the number of calls and the number of non-calls for each reference API in the identification DB 44 are each greater than or equal to a given value, the estimation unit 24 performs estimation described below. That is, in this case, the estimation unit 24 estimates the value in the value column of a record having the largest value in the number of non-calls column to be the value of the remaining item number field when there are no remaining items. This is because when calling a reference API results in that there are no remaining items, it is estimated that an update API will not be called corresponding to the reference API. The estimation unit 24 then stores the estimated value in the no remaining items value column corresponding to the reference API in the association DB 42.

For a combination of a reference API and an update API in the association DB 42, when the update API is called within the predetermined period after the reference API has been called, the estimation unit 24 performs processing described below. That is, in this case, the estimation unit 24 estimates a field having matching values in an execution result of the reference API and in request information corresponding to the update API, as a field uniquely identifying each of the processing targets of the reference API and the update API. The estimation unit 24 then stores a path identifying the estimated field corresponding to the execution result of the reference API in the reference API unique field column corresponding to the combination of the reference API and the update API in the association DB 42. The estimation unit 24 stores a path identifying the estimated field corresponding to the request information in the update API unique ID field column corresponding to the combination of the reference API and the update API in the association DB 42. Hereinafter, the values of the field whose paths are stored in these unique ID field columns are each referred to as a unique ID.

Figure 9:
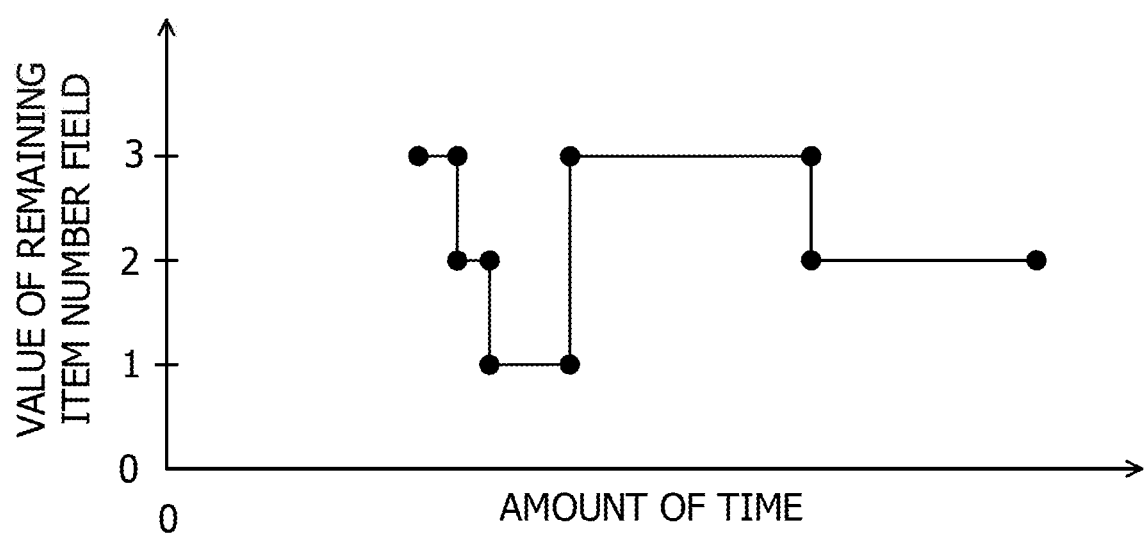
FIG. 9 is a graph illustrating an example of information stored in a remaining number history DB.

The calculation unit 26 references the remaining item history DB 46 and, for the respective unique ID of each reference API in the association DB 42, calculates an estimated amount of time for the value of the remaining item number field to move from the state where there are remaining items to the state where there are no remaining items. By way of example, as illustrated in FIG. 9, for each of the values (unique IDs) of the respective unique ID fields corresponding to the reference APIs, history information on the amount of time for the value of the number of remaining items to change when the value of the number of remaining items has changed is stored in the remaining item history DB 46. In FIG. 9, the vertical axis represents the value of the remaining item number field, and the horizontal axis represents the amount of time. FIG. 9 illustrates an example of the case where the number of remaining items is greater than or equal to a certain value when the value of the remaining item number field is "3", the case where the number of remaining items is greater than or equal to one and less than the certain value when the value of the remaining item number field is "2", and the case where there are no remaining items when the value of the remaining item number field is "1".

In the present embodiment, the calculation unit 26 calculates, as the estimated amount of time described above, the shortest amount of time among amounts of time in the past for the value of the remaining item number field to move from the state where there are remaining items to the state where there are no remaining items. In the example illustrated in FIG. 9, the calculation unit 26 calculates the shortest amount of time for the value of the remaining item number field to move from "3" to "1" and the shortest amount of time for the value of the remaining item number field to move from "2" to "1". The calculation unit 26 then stores a value representing that there are remaining items in the remaining item number field, and the shortest amount of time in association with a combination of the reference API and the unique ID in the shortest amount of time DB 48. FIG. 10 illustrates an example of the shortest amount of time DB 48. In the example in FIG. 10, it is illustrated, for example, that the shortest amount of time for the value of the remaining item number field of the goods with a unique ID of "978-4-XX-YY", which is a search result obtained by using "A-system API 2", to move from "3" (the number of remaining items being greater than or equal to the certain number) to "1" (no remaining items) is "20 minutes". The calculation unit 26 may calculate, for example, the shortest amount of time among amounts of time taken from the state where the number of remaining items is greater than or equal to the certain value to the state where the number of remaining items is greater than or equal to one and less than the certain value.

Taking into account the frequency of calling an update API at the time when the shortest amount of time has been calculated and the frequency of calling the update API at the current time, the calculation unit 26 calculates the amount of margin time from the state where there are remaining items to the state where there are no remaining items according to equation (1) expressed below.

$$\text{Amount of margin time} = \text{shortest amount of time} \times \frac{\text{frequency of calls at the time of calculation of shortest amount of time}}{\text{frequency of calls at current time}} \quad (1)$$

For example, in the case where the shortest amount of time is "20 minutes", the frequency of calling an update API at the time when the calculation unit 26 has calculated the shortest amount of time is "twice per minute", and the frequency of calling the update API at the current time is "five times per minute", the amount of margin time is calculated to be "eight minutes" (=20×2÷5).

The storage control unit 28 stores update information, which is updated as a result of the call to an update API in accordance with request information accepted by the acceptance unit 16, in the update information DB 50. In the present embodiment, description will be given of the case where the value of the remaining item number field, which varies by calling an update API that performs reservation processing, purchase processing, and the like, is applied as update information. The storage control unit 28 regularly performs the processing described below for each of combinations of reference APIs and unique IDs in the shortest amount of time DB 48. That is, the storage control unit 28 causes the execution unit 32 described below to call a reference API by using the unique ID and acquires the value of the remaining item number field from an execution result of the called reference API. The storage control unit 28 then stores the reference API, the unique ID, the acquired value of the remaining item number field, and the time at which the value of the remaining item number field has been acquired, in association with each other in the update information DB 50. FIG. 11 illustrates an example of the update information DB 50. As illustrated in FIG. 11, a reference API, a unique ID, the value of the remaining item number field, and an acquisition time are stored in the update information DB 50.

Figure 12:
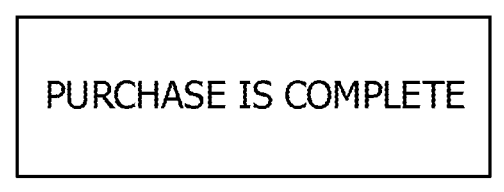

The storage control unit 28 regularly stores response information that the response unit 34 described below transmits to the entity 12 in accordance with an execution result of each reference API, in association with the reference API in the response information DB 52. FIG. 12 illustrates an example of response information. In FIG. 12, an example of response information corresponding to an update API is illustrated. As illustrated in FIG. 12, response information stored in the response information DB 52 in the present embodiment is information including a message indicating that the processing of the corresponding API is complete.

When the acceptance unit 16 has accepted request information corresponding to update processing, the determination unit 30 determines in accordance with the value of the remaining item number field in the update information DB 50 whether response information in the response information DB 52 is to be transmitted to the entity 12 from which the request information was transmitted. In the present embodiment, the determination unit 30 references the update information DB 50 and acquires the value of the remaining item number field and the acquisition time corresponding to the reference API associated with an update API corresponding to the reference information accepted by the acceptance unit 16. The determination unit 30 then determines not to transmit response information in the response information DB 52 to the entity 12 from which the request information was transmitted, if the value of the remaining item number field is a value representing that there are no remaining items.

Otherwise, if the value of the remaining item number field is a value representing that there are remaining items, the determination unit 30 determines whether the amount of time from the acquisition time to the current time is greater than or equal to the amount of margin time at the current time calculated by the calculation unit 26. Depending on this determination, the determination unit 30 determines whether to transmit response information in the response information DB 52 to the entity 12 from which the request information was transmitted.

The execution unit 32 calls an API 14 in accordance with request information accepted by the acceptance unit 16 and thus performs processing in accordance with the request information.

When the processing performed by the execution unit 32 is reference processing, the response unit 34 references the response information DB 52 and transmits response information corresponding to a reference API called by the execution unit 32 to the entity 12 from which the request information was transmitted. When the processing performed by the execution unit 32 is update processing and if the determination unit 30 determines to transmit response information in the response information DB 52 to the entity 12 from which the request information was transmitted, the response unit 34 performs processing described below. That is, in this case, the response unit 34 references the response information DB 52 and, without waiting for the update processing to be completed by the execution unit 32, transmits response information corresponding to an update API called by the execution unit 32 to the entity 12 from which the request information was transmitted.

When the update processing performed by the execution unit 32 has resulted in an error after the response unit 34 has transmitted response information in the response information DB 52 to the entity 12 without waiting for the update processing to be completed by the execution unit 32, the response unit 34 further transmits information indicating that the update processing has resulted in an error to the entity 12.

Otherwise, when the processing performed by the execution unit 32 is update processing and if the determination unit 30 determines not to transmit response information in the response information DB 52 to the entity 12 from which the request information was transmitted, the response unit 34 waits for the update processing to be completed by the execution unit 32. In this case, the response unit 34 then transmits response information indicative of a result of the update processing performed by the execution unit 32 to the entity 12 from which the request information was transmitted.

Figure 13:
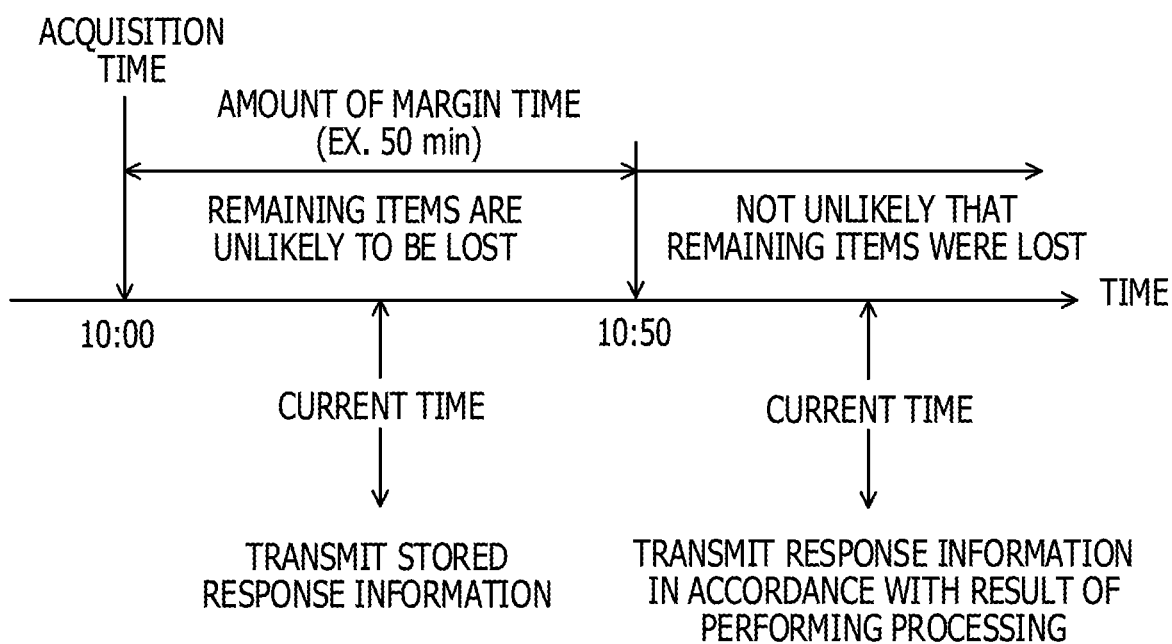
FIG. 13 is a diagram illustrating a difference in response information depending on a timing.

That is, as illustrated in FIG. 13 by way of example, in the present embodiment, the update processing apparatus 10 determines that the likelihood that there will be no remaining items is relatively low within the amount of margin time calculated according to the above equation (1) from the time at which the value of the remaining item number field in the update information DB 50 is acquired. In this case, the update processing apparatus 10 transmits response information stored in the response information DB 52 to the entity 12 without waiting for the update processing to be completed by the execution unit 32.

On the other hand, at any time later than the time obtained by adding the amount of margin time to the acquisition time, the update processing apparatus 10 determines that it would not be unlikely if, even in the case where the value of the remaining item number field in the update information DB 50 is a value representing that there are remaining items, the remaining items were lost. In this case, the update processing apparatus 10 waits for update processing to be completed by the execution unit 32, and transmits response information indicative of a result of performing the update processing to the entity 12.

Figure 14:
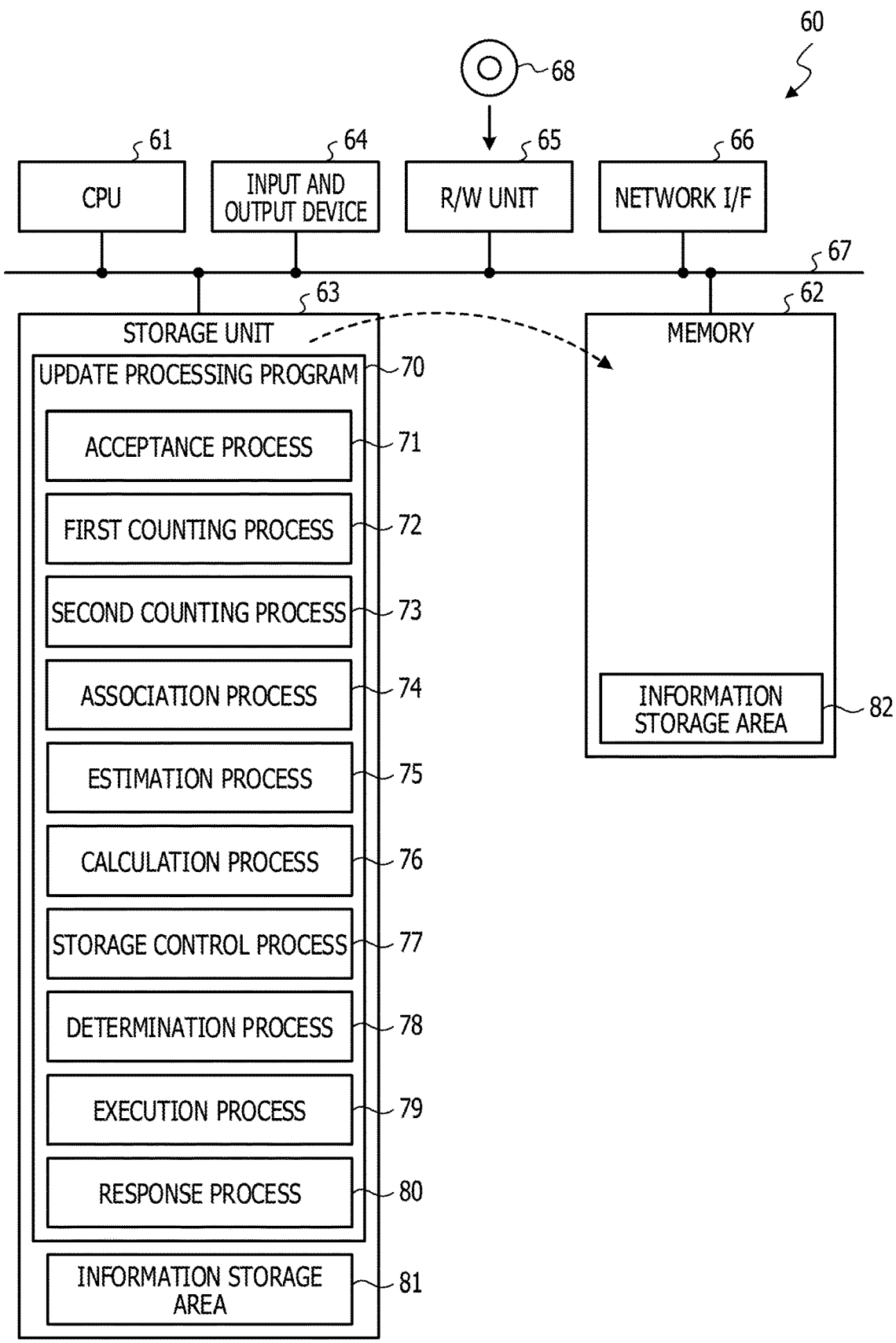
FIG. 14 is a block diagram illustrating a schematic configuration of a computer that functions as the update processing apparatus according to the embodiment.

The update processing apparatus 10 may be implemented by a computer 60 illustrated, for example, in FIG. 14. The computer 60 includes a central processing unit (CPU) 61, a memory 62 as a temporary storage area, and a nonvolatile storage unit 63. The computer 60 further includes an input and output device 64 such as a display device and an input device. The computer 60 further includes a read/write (R/W) unit 65 that controls reading and writing data from and to the recording medium 68, and a network interface (I/F) 66 coupled to a network. The CPU 61, the memory 62, the storage unit 63, the input and output device 64, the R/W unit 65, and the network I/F 66 are coupled to each other via a bus 67.

The storage unit 63 may be implemented by a hard disk drive (HDD), a solid state drive (SSD), a flash memory, or the like. In the storage unit 63 functioning as a storage medium, an update processing program 70 for causing the computer 60 to function as the update processing apparatus 10 is stored. The update processing program 70 includes an acceptance process 71, a first counting process 72, a second counting process 73, an association process 74, an estimation process 75, a calculation process 76, a storage control process 77, a determination process 78, an execution process 79, and a response process 80. The storage unit 63 includes an information storage area 81 in which the combination DB 40, the association DB 42, the identification DB 44, the remaining item history DB 46, and the shortest amount of time DB 48 are stored. The memory 62 includes an information storage area 82 in which the update information DB 50 and the response information DB 52 are stored.

The CPU 61 reads the update processing program 70 from the storage unit 63 and loads the read update processing program 70 into the memory 62, and executes a process included in the update processing program 70. The CPU 61 operates as the acceptance unit 16 illustrated in FIG. 3 by executing the acceptance process 71. The CPU 61 operates as the first counting unit 18 illustrated in FIG. 3 by executing the first counting process 72. The CPU 61 operates as the second counting unit 20 illustrated in FIG. 3 by executing the second counting process 73. The CPU 61 operates as the association unit 22 illustrated in FIG. 3 by executing the association process 74. The CPU 61 operates as the estimation unit 24 illustrated in FIG. 3 by executing the estimation process 75. The CPU 61 operates as the calculation unit 26 illustrated in FIG. 3 by executing the calculation process 76. The CPU 61 operates as the storage control unit 28 illustrated in FIG. 3 by executing the storage control process 77. The CPU 61 operates as the determination unit 30 illustrated in FIG. 3 by executing the determination process 78. The CPU 61 operates as the execution unit 32 illustrated in FIG. 3 by executing the execution process 79. The CPU 61 operates as the response unit 34 illustrated in FIG. 3 by executing the response process 80. Thereby, the computer 60 that has executed the update processing program 70 functions as the update processing apparatus 10. The CPU 61 that executes processes included in the update processing program 70 is hardware.

The functions achieved by the update processing program 70 may be achieved, for example, by a semiconductor integrated circuit and, more particularly, by an application specific integrated circuit (ASIC) or the like.

Figure 15:
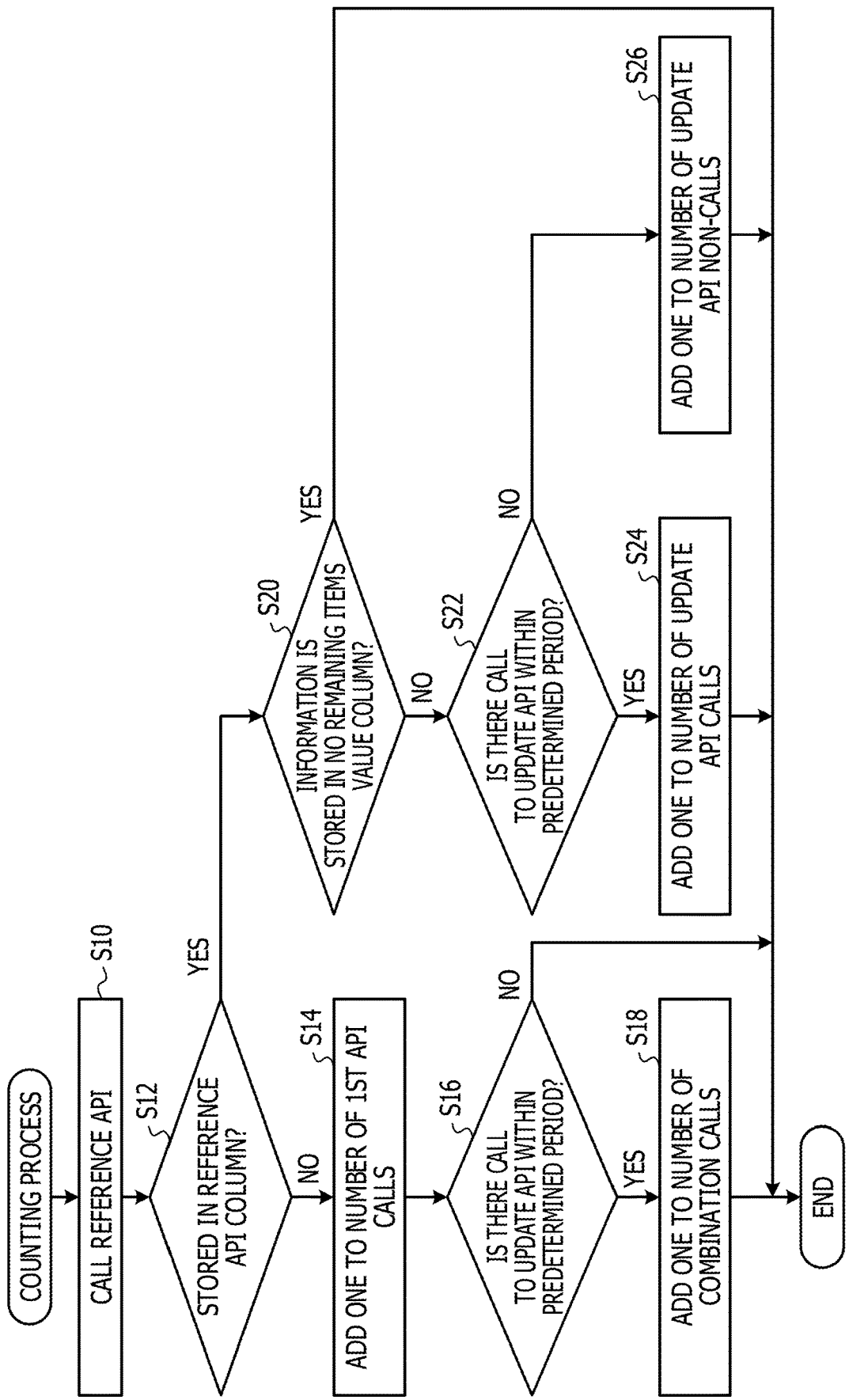
FIG. 15 is a flowchart illustrating an example of a counting process according to the embodiment.
Figure 16:
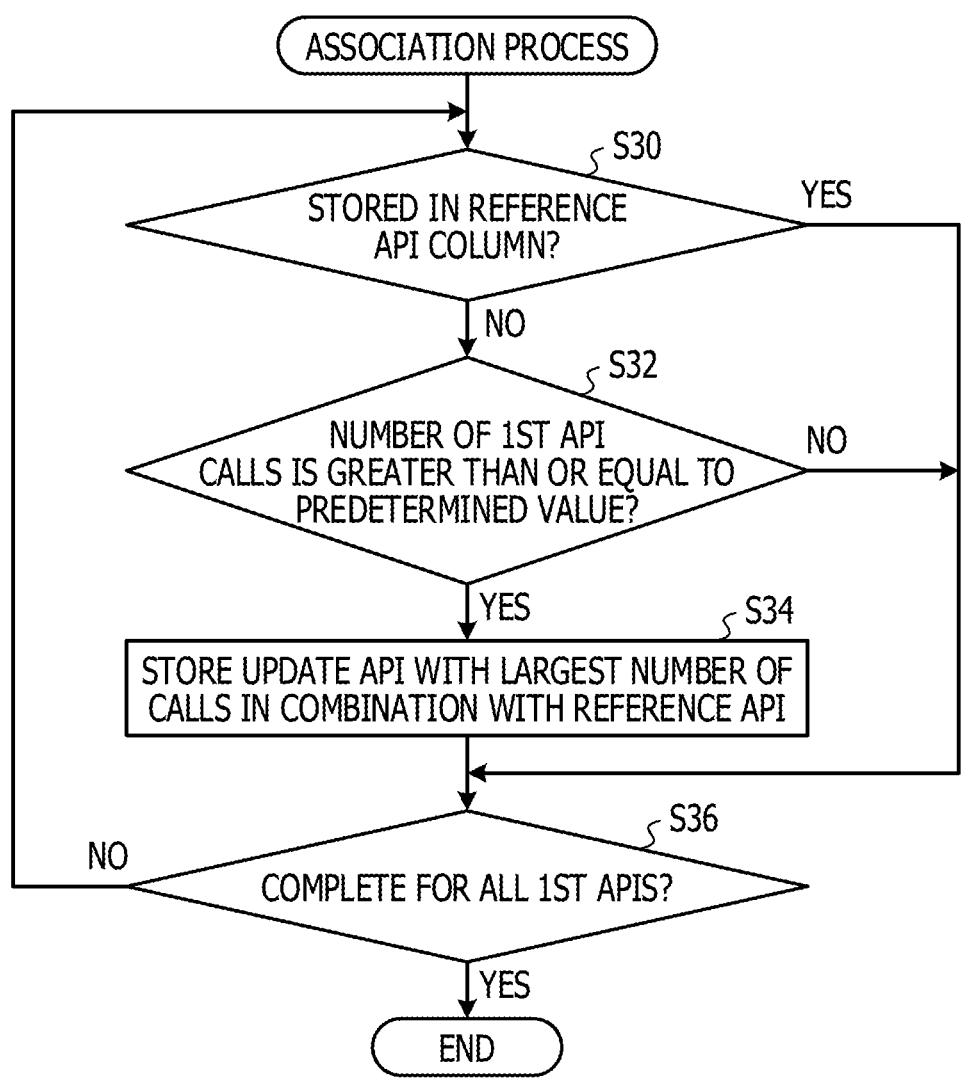
FIG. 16 is a flowchart illustrating an example of an association process according to the embodiment.
Figure 17:
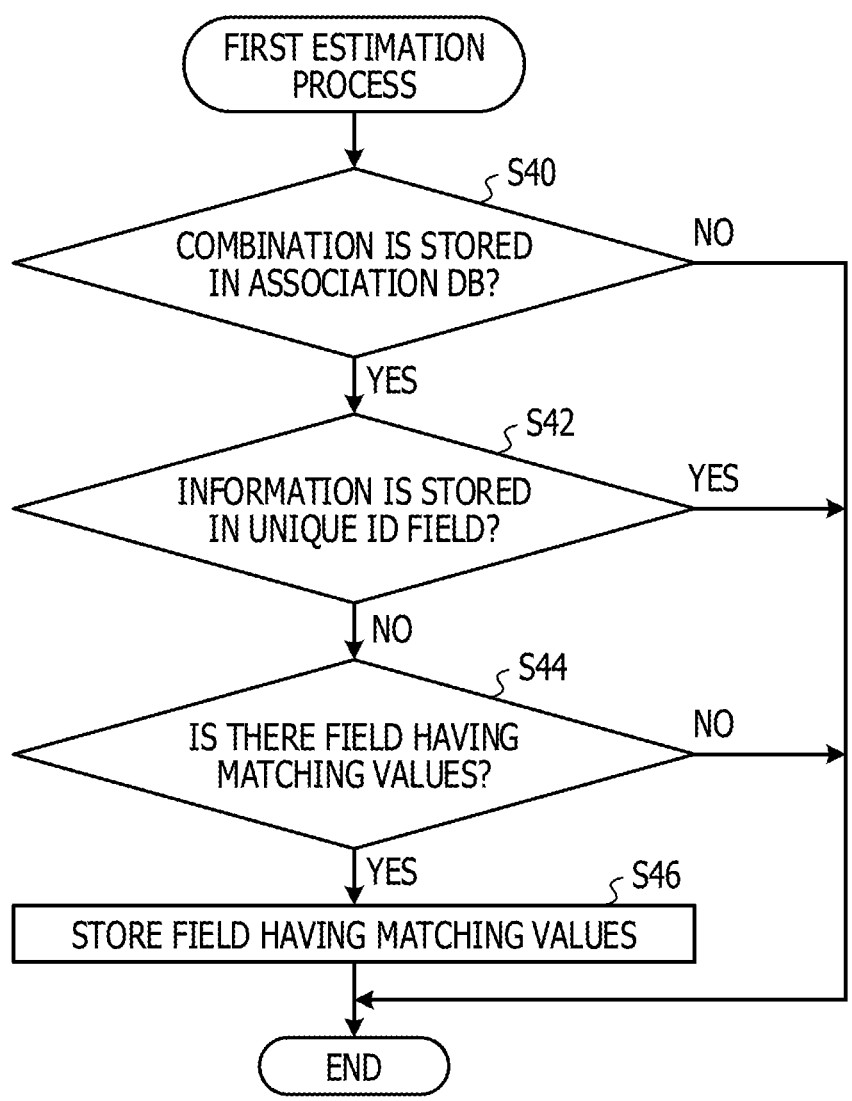
FIG. 17 is a flowchart illustrating an example of a first estimation process according to the embodiment.
Figure 18:
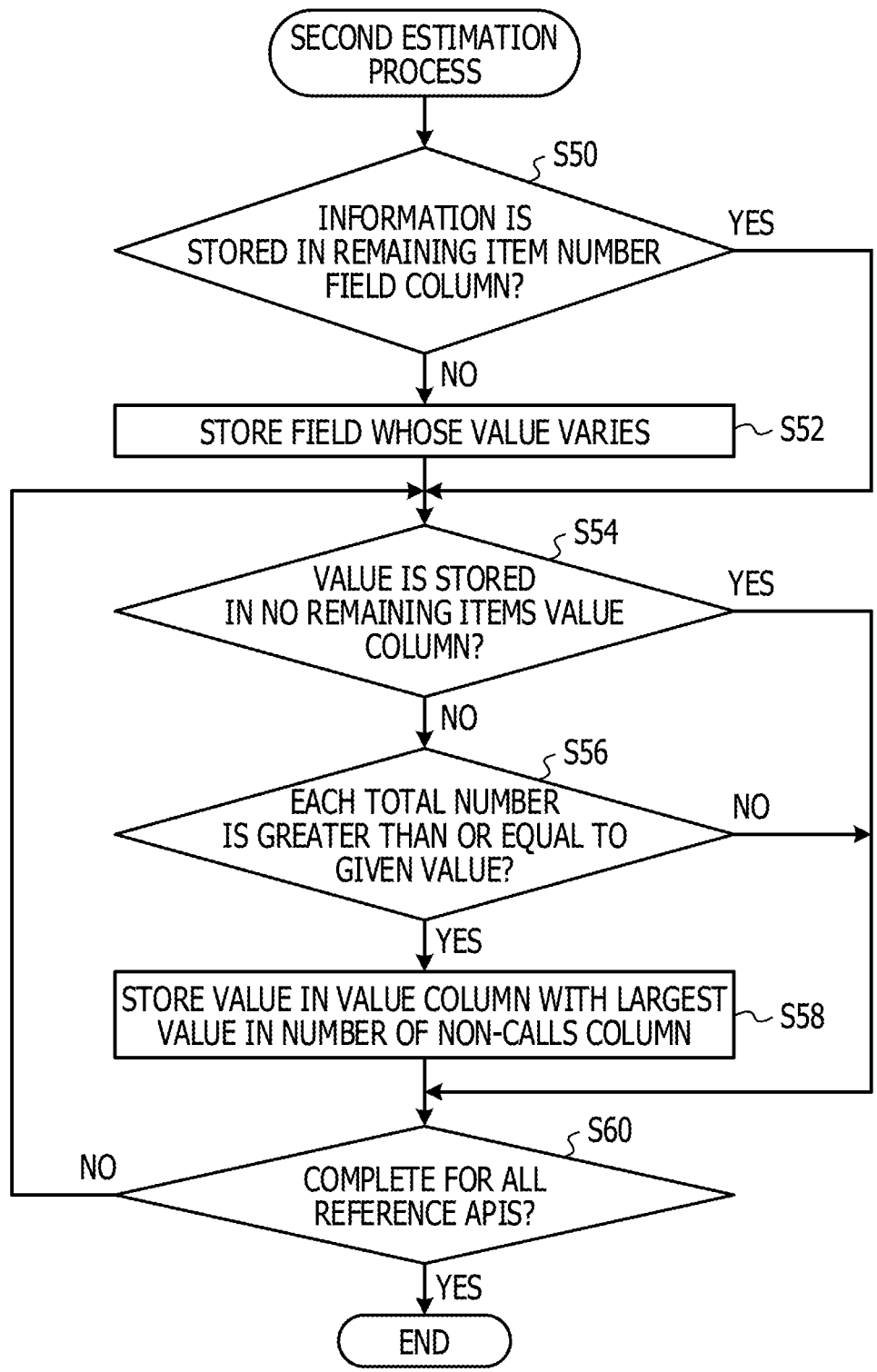
FIG. 18 is a flowchart illustrating an example of a second estimation process according to the embodiment.
Figure 19:
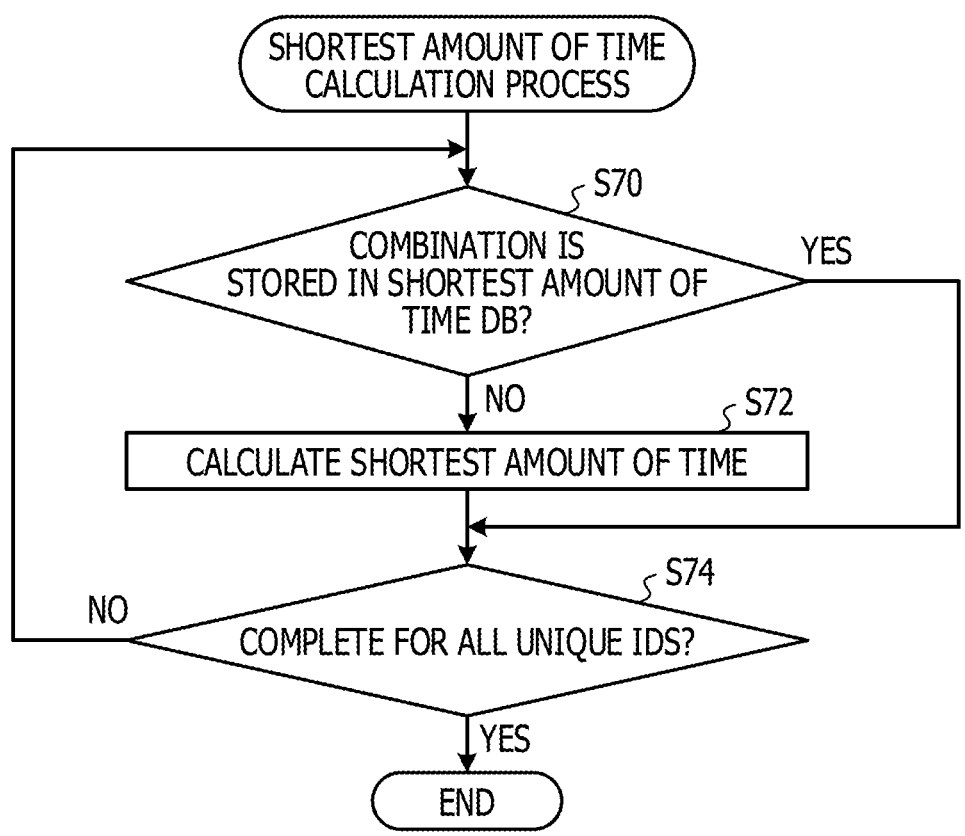
FIG. 19 is a flowchart illustrating an example of a shortest amount of time calculation process according to the embodiment.
Figure 20:
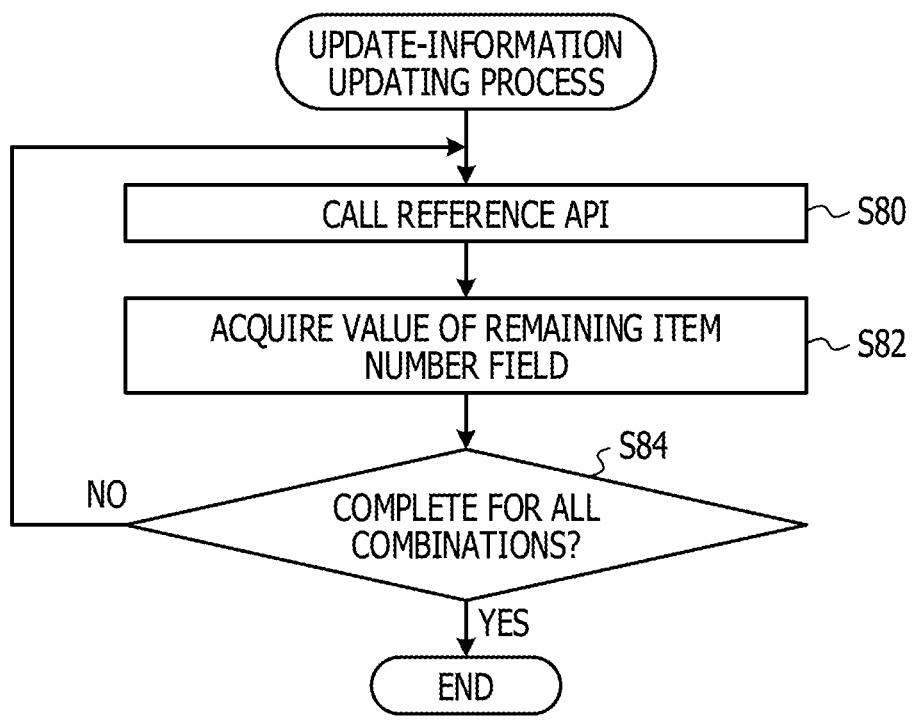
FIG. 20 is a flowchart illustrating an example of an update-information updating process according to the embodiment.
Figure 21:
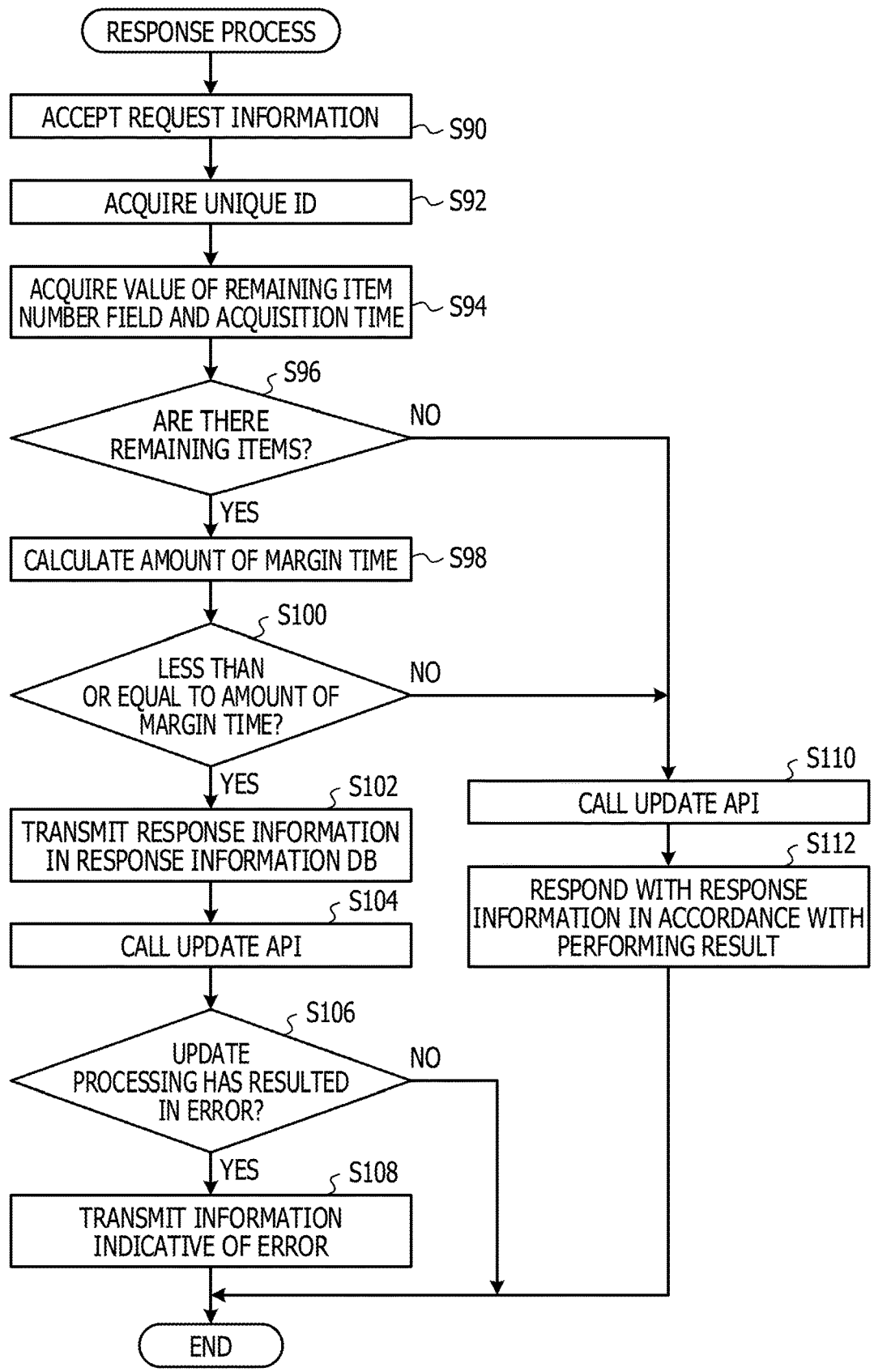
FIG. 21 is a flowchart illustrating an example of a response process according to the embodiment.

Next, the operations of the update processing apparatus 10 according to the present embodiment will be described. The update processing apparatus 10 executes the update processing program 70, thereby executing a counting process illustrated in FIG. 15, an association process illustrated in FIG. 16, a first estimation process illustrated in FIG. 17, a second estimation process illustrated in FIG. 18, and a shortest amount of time calculation process illustrated in FIG. 19. In addition, the update processing apparatus 10 executes the update processing program 70, thereby executing an update-information updating process illustrated in FIG. 20 and a response process illustrated in FIG. 21. The counting process illustrated in FIG. 15 is executed, for example, when the acceptance unit 16 has accepted request information corresponding to reference processing transmitted from the entity 12. The association process illustrated in FIG. 16 is, for example, regularly executed. The first estimation process illustrated in FIG. 17 is executed, for example, when an update API is called within the predetermined period after a reference API has been called. The second estimation process illustrated in FIG. 18 is, for example, regularly executed. The shortest amount of time calculation process illustrated in FIG. 19 is, for example, regularly executed. The update-information updating process illustrated in FIG. 20 is, for example, regularly executed. The response process illustrated in FIG. 21 is executed, for example, when the update processing apparatus 10 has received request information corresponding to update processing transmitted from the entity 12.

In S10 in the counting process illustrated in FIG. 15, the execution unit 32 calls a reference API in accordance with request information accepted by the acceptance unit 16. Then, the response unit 34 references the response information DB 52 and transmits response information corresponding to the reference API called by the execution unit 32 to the entity 12 from which the request information was transmitted.

Next in S12, the first counting unit 18 determines whether information identifying the reference API called in S10 is stored in the reference API column of the association DB 42. If this determination is negative, the process proceeds to S14. In S14, the first counting unit 18 adds one to the value of the number of 1st API calls column corresponding to the reference API called in S10 of the combination DB 40.

Next in S16, the first counting unit 18 determines whether an update API is called within a predetermined period after the reference API has been called in S10. If this determination is affirmative, the process proceeds to S18. In S18, the first counting unit 18 adds one to the value of the number of combination calls column corresponding to a combination of the reference API called in S10 and the update API called within the predetermined period in the combination DB 40. Upon completion of the process in S18, this counting process ends. If the determination in S16 is negative, the process in S18 is not executed and this counting process ends.

Otherwise, if the determination in S12 is affirmative, the process proceeds to S20. In S20, the second counting unit 20 determines whether information is stored in the no remaining items value column corresponding to the reference API called in S10 in the association DB 42. If this determination is negative, the process proceeds to S22. In S22, the second counting unit 20 determines whether the update API associated with the reference API is called within the predetermined period after the reference API has been called in S10. If this determination is negative, the process proceeds to S26; if the determination is affirmative, the process proceeds to S24.

In S24, the second counting unit 20 adds one to the value of the number of update API calls column in the identification DB 44 corresponding to the value of each field of an execution result of the reference API called in S10. Upon completion of the process in S24, this counting process ends. Otherwise, in S26, the second counting unit 20 adds one to the value of the number of update API non-calls column in the identification DB 44 corresponding to the value of each field of an execution result of the reference API called in S10. Upon completion of the process in S26, this counting process ends. If the determination in S20 is affirmative, this counting process also ends.

S30 to S34 of the association process illustrated in FIG. 16 are repeatedly executed, in which each reference API stored in the 1st API column in the combination DB 40 is used for processing. When S30 to S34 are repeatedly executed, a reference API that has not been used for processing is a reference API for processing. In S30, the association unit 22 determines whether information identifying the reference API for processing is stored in the reference API column of the association DB 42. If this determination is affirmative, the process proceeds to S36; if the determination is negative, the process proceeds to S32.

In S32, the association unit 22 references the combination DB 40 and determines whether the value of the number of 1st API calls column corresponding to the reference API for processing is greater than or equal to a predetermined value. If this determination is negative, the process proceeds to S36; if the determination is affirmative, the process proceeds to S34.

In S34, the association unit 22 identifies, among update APIs stored in the 2nd API column corresponding to the reference API for processing stored in the combination DB

40, an update API with the largest value of the number of combination calls column. The association unit 22 then stores the reference API for processing in association with the identified update API in the association DB 42.

In S36, the association unit 22 determines whether the process in S30 to S34 described above is complete for all the reference APIs stored in the 1st API column of the combination DB 40. If this determination is negative, the process returns to S30; if the determination is affirmative, this association process ends.

After completion of the process in S34, the association unit 22 may delete records in the association DB 42 corresponding to the reference API for processing. In such a case, the process in S30 is unnecessary.

In S40 of the first estimation process illustrated in FIG. 17, the estimation unit 24 determines whether a combination of a reference API and an update API called within the predetermined period after the reference API has been called is stored in the reference API column and the update API column in the association DB 42. If this determination is affirmative, the process proceeds to S42.

In S42, the estimation unit 24 references the association DB 42 and determines whether information is stored in each unique ID field column corresponding to a combination of a reference API and an update API called within the predetermined period after the reference API has been called. If this determination is negative, the process proceeds to S44.

In S44, the estimation unit 24 determines whether there is a field having matching values between an execution result of the reference API of the above combination and request information corresponding to the update API. If this determination is affirmative, the process proceeds to S46.

In S46, the estimation unit 24 estimates a field having matching values between an execution result of the reference API and request information corresponding to the update API as a field that uniquely identifies processing targets of the reference API and the update API. The estimation unit 24 stores a path identifying the estimated field corresponding to the execution result of the reference API in the reference API unique ID field column corresponding to the combination of the reference API and the update API in the association DB 42. The estimation unit 24 stores a path identifying the estimated field corresponding to the request information of the update API in the update API unique ID field column corresponding to the combination of the reference API and the update API in the association DB 42. Upon completion of the process in S46, this first estimation process ends. Otherwise, if the determination in S40 is negative, if the determination in S42 is affirmative, or if the determination in S44 is negative, this first estimation process ends.

In S50 of the second estimation process illustrated in FIG. 18, the estimation unit 24 references the association DB 42 and determines whether information is stored in the remaining item number field column corresponding to a reference API whose execution result is temporarily stored in the given storage area. If this determination is affirmative, the process proceeds to S54; if the determination is negative, the process proceeds to S52.

In S52, as described above, the estimation unit 24 estimates a field whose value in an execution result of the reference API varies between the case where the update API is called within the predetermined period after the reference API has been called and the case where the update API is not called, as the remaining item number field. The estimation unit 24 then stores a path identifying the estimated remaining item number field in the remaining item number field column corresponding to the reference API in the association DB 42.

S54 to S58 described below are repeatedly executed, in which a combination of each reference API stored in the reference API column in the identification DB 44 and the estimated remaining item number field is a combination for processing. When S54 to S58 are repeatedly executed, a combination that has not been used for processing is a combination for processing. In S54, the estimation unit 24 references the association DB 42 and determines whether a value is stored in the no remaining items value column corresponding to the reference API for processing. If this determination is affirmative, the process proceeds to S60; if the determination is negative, the process proceeds to S56.

In S56, the estimation unit 24 references the identification DB 44 and determines whether the total value of the number of calls column and the total value of the number of non-calls column of the update API corresponding to the combination of the reference API and the remaining item number field for processing are each greater than or equal to the given value. If this determination is negative, the process proceeds to S60; if the determination is affirmative, the process proceeds to S58.

In S58, the estimation unit 24 estimates, among values corresponding to the combination of the reference API and the remaining item number field for processing, a value for which the value in the number of update API non-calls column is largest, as the value of the remaining item number field in the case where there are no remaining items. The estimation unit 24 then stores the estimated value in the no remaining items value column corresponding to the reference API for processing in the association DB 42.

In S60, the estimation unit 24 determines whether the process in S54 to S58 described above is complete for all of the reference APIs stored in the reference API column in the identification DB 44. If this determination is negative, the process returns to S54; if the determination is affirmative, this second estimation process ends.

After completion of the process in S58, the estimation unit 24 may delete the records in the identification DB 44 corresponding to the reference API for processing. In such a case, the process in S54 is unnecessary.

S70 and S72 of the shortest amount of time calculation process illustrated in FIG. 19 are repeatedly executed, in which each history information about a combination of a reference API and a unique ID in the remaining item history DB 46 is history information for processing. When S70 and S72 are repeatedly executed, a combination that has not been used for processing is a combination for processing.

In S70, the calculation unit 26 determines whether the reference API and the unique ID of the combination for processing are stored in the shortest amount of time DB 48. If this determination is affirmative, the process proceeds to S74; if the determination is negative, the process proceeds to S72.

In S72, the calculation unit 26 references the remaining item history DB 46 and calculates, for the combination of the reference API and the unique ID for processing, the shortest amount of time among amounts of time in the past for the value of the remaining item number field to move from the state where there are remaining items to the state where there are no remaining items. The calculation unit 26 then stores the value of the remaining item number field representing that there are remaining items and the calculated shortest amount of time in the shortest amount of time DB 48, in association with the combination of the reference API and the unique ID for processing, in the shortest amount of time DB 48.

In S74, the calculation unit 26 determines whether the process in S70 to S72 described above is complete for all of the combinations of reference APIs and unique IDs stored in the remaining item history DB 46. If this determination is negative, the process returns to S70; if the determination is affirmative, this shortest amount of time calculation process ends.

S80 and S82 of the update-information updating process illustrated in FIG. 20 are repeatedly executed, in which each of the combinations of reference APIs and unique IDs in the shortest amount of time DB 48 is a combination for processing. When S80 and S82 are repeatedly executed, a combination that has not been used for processing is a combination for processing.

In S80, the execution unit 32 calls the reference API for processing by using the unique ID for processing as a search target, and thus performs reference processing for searching for the unique ID for processing.

In S82, the storage control unit 28 references the association DB 42 and acquires the path of the remaining item number field corresponding to the reference API for processing. The storage control unit 28 acquires the value of the remaining item number field identified by the acquired path of the remaining item number field from an execution result of the reference API called in S80. The storage control unit 28 then stores the reference API for processing, the unique ID for processing, the acquired value of the remaining item number field, and the acquisition time in association with each other in the update information DB 50.

In S84, the storage control unit 28 determines whether the process in S80 and S82 described above is complete for all of the combinations of reference APIs x and unique IDs stored in the shortest amount of time DB 48. If this determination is negative, the process returns to S80; if the determination is affirmative, this update-information updating process ends.

In S90 of the response process illustrated in FIG. 21, the acceptance unit 16 accepts request information corresponding to update processing transmitted from the entity 12. Next in S92, the determination unit 30 references the association DB 42 and acquires a unique ID field corresponding to an update API to be called in accordance with the request information accepted in S90. The determination unit 30 then acquires a unique ID identified by the acquired unique ID field and included in the request information accepted in S90.

Next in S94, the determination unit 30 references the association DB 42 and acquires a reference API corresponding to the update API to be called in accordance with the request information accepted in S90. The determination unit 30 then references the update information DB 50 and acquires the value of the remaining item number field and the acquisition time corresponding to the combination of the acquired reference API and the unique ID acquired in S92.

Next in S96, the determination unit 30 determines whether the value of the remaining item number field acquired in S94 is a value representing that there are remaining items. If this determination is negative, the process proceeds to S110; if the determination is affirmative, the process proceeds to S98. In S98, the calculation unit 26 references the shortest amount of time DB 48 and acquires the shortest amount of time corresponding to a combination of the reference API acquired in S94, the unique ID acquired in S92, and the value acquired in S94. The calculation unit 26 then calculates the amount of margin time by using the shortest amount of time acquired according to the above equation (1).

Next in S100, the determination unit 30 determines whether the amount of time from the acquisition time acquired in S94 to the current time is less than or equal to the amount of margin time calculated in S98. If this determination is negative, the process proceeds to S110; if the determination is affirmative, the process proceeds to S102.

In S102, the response unit 34 references the response information DB 52 and acquires response information corresponding to the update API to be called in accordance with the request information accepted in S90. The response unit 34 then transmits the acquired response information to the entity 12 from which the request information accepted in S90 was transmitted. Next in S104, the execution unit 32 calls an update API corresponding to the request information accepted in S90, and thus performs update processing in accordance with the request information.

Next in S106, the execution unit 32 determines whether the update processing performed in S104 has resulted in an error. If this determination is affirmative, the process proceeds to S108. In S108, the response unit 34 transmits information indicating that the update processing has resulted in an error to the entity 12 from which the request information accepted in S90 was transmitted. Upon completion of the process in S108, this response process ends. If the determination in S106 is negative, the process in S108 is not executed and this response process ends.

Otherwise, in S110, the execution unit 32 calls an update API corresponding to the request information accepted in S90, and thus performs update processing in accordance with the request information. Next in S112, the response unit 34 transmits response information indicative of a result of performing update processing in S110 to the entity 12 from which the request information accepted in S90 was transmitted. Upon completion of the process in S112, this response process ends.

As described above, according to the present embodiment, update information, which is updated in accordance with update processing performed in accordance with accepted request information, and response information used for response to the update processing are stored in the memory 62. When request information corresponding to the update information is accepted, it is determined in accordance with the value of the update information whether the response information stored in the memory 62 is to be transmitted to the transmission source of the request information. If it is then determined that the response information stored in the memory 62 is to be transmitted to the transmission source of the request information, the response information stored in the memory 62 is transmitted to the transmission source of the request information without waiting for the update processing to be completed. Accordingly, the response performance in update processing may be improved.

According to the present embodiment, when update processing has resulted in an error after response information stored in the memory 62 has been transmitted to the transmission source of request information, information indicating that the update processing has resulted in an error is further transmitted to the transmission source. Accordingly, even after receiving response information stored in the memory 62, the entity 12 may recognize that update processing has resulted in an error.

According to the present embodiment, information is stored in the association DB 42 and the shortest amount of time DB 48 by execution of the update processing program 70. Accordingly, time and energy of the administrator of the update processing apparatus 10 may be reduced.

In the above embodiment, the administrator of the update processing apparatus 10 may prepare the association DB 42 manually. In such a case, the combination DB 40 and the identification DB 44 are unnecessary. Likewise, the administrator may prepare the shortest amount of time DB 48 manually.

In the above embodiment, the shortest amount of time may be set as the amount of margin time without taking the frequency of calling the update API into account. In the above embodiment, the calculation unit 26 may regularly calculate the amount of margin time and store the calculated amount of margin time in the shortest amount of time DB 48. In this case, in S98 of the above response process, the amount of margin time may be acquired from the shortest amount of time DB 48.

In the above embodiment, the update information DB 50 and the response information DB 52 may be stored in the storage unit 63.

In the above embodiment, the manner in which the update processing program 70 is stored (installed) in advance in the storage unit 63 has been described; however, embodiments are not limited thereto. The update processing program 70 may be provided in a form of being recorded on a recording medium such as CD-ROM, DVD-ROM, USB memory, or memory card.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An update processing method executed by a processor included in an update processing apparatus, the update processing method comprising:
   receiving request information corresponding to an update processing;
   acquiring, from a memory, a value of remaining items that is decreased each time when the update processing is executed;
   when the value of remaining items represents that there are not remaining items, calculating a margin time indicating a period till the value of the remaining items reaches a value representing that there are not remaining items based on a frequency of calls of an application programming interface (API) used at a time of the update processing;
   determining whether an elapsed time after the value of the remaining items is acquired is equal to or shorter than the margin time;
   when it is determined that the elapsed time is equal to or less than the margin time, transmitting response information used for a response to the request information stored in the memory back to a transmission source of the request information without waiting for a completion of execution of the update processing; and
   when it is determined that the elapsed time is not equal to or less than the margin time, waiting for the update processing to be completed and transmitting the response information indicative of a result of performing the update processing back to the transmission source.

2. The update processing method according to claim 1, further comprising:
   transmitting, back to the transmission source, information indicating that the update processing has resulted in an error, when the update processing has resulted in the error after the response information stored in the memory has been transmitted back to the transmission source.

3. The update processing method according to claim 1, further comprising
   storing, in the memory, history information regarding a change in the value of the remaining items,
   wherein the calculating includes calculating, by referencing the history information, the margin time during which the value of the remaining items maintains a value satisfying a condition for transmitting response information stored in the storage unit back to the transmission source; and
   wherein the determining includes
      when the request information corresponding to the update processing has been accepted and when the value of the remaining items is a value satisfying the condition, determining whether to transmit the response information stored in the memory back to the transmission source, depending on whether an amount of time from an acquisition time at which the value of the remaining items has been acquired from the other computer to the current time is less than or equal to the calculated amount of margin time.

4. The update processing method according to claim 3, wherein
   the value of the remaining items includes information indicative of the number of remaining items of goods, and
   the condition states that there are remaining items.

5. The update processing method according to claim 4, wherein
   the calculating includes calculating, by referencing the history information, the margin time from a state where there are remaining items to a state where there are no remaining items, and
   the determining includes, when the request information corresponding to the update processing has been accepted and when the value of the remaining items includes a value representing that there are remaining items, determining whether to transmit the response information stored in the memory back to the transmission source, depending on whether the amount of time from the acquisition time to the current time is less than or equal to the calculated amount of margin time.

6. The update processing method according to claim 5, wherein a result of performing reference processing in accordance with the accepted request information includes a plurality of fields each of which includes a combination of a value and a name corresponding to the value,
   the update processing method further comprising:
      associating, with the reference processing, the update processing executed most times in the update processing executed within a predetermined period after the reference processing has been executed in accordance with the accepted request information, and estimating, among the plurality of fields, a field whose value varies between a case where the update processing associated with the reference processing has been executed within the predetermined period and a case where the update processing associated with the reference processing has not been executed within the predetermined period, as a field in which the number of remaining items of the goods is to be stored.

7. The update processing method according to claim 6, further comprising
estimating that, among values of the estimated field in which the number of remaining items of the goods is to be stored, the field being included in a result of performing the reference processing when the update processing associated with the reference processing has not been executed within the predetermined period after reference processing has been executed in accordance with the accepted request information, a value with which the update processing has not been executed most times is a value representing that there are no remaining items of the goods.

8. The update processing method according to claim 1, wherein the interface is an application programming interface (API).

9. The update processing method according to claim 1, further comprising
calculating a shortest amount of time among amounts of time in a past for the value of remaining item to move from a state where there are remaining items to a state where there are no remaining items,
wherein the calculating the margin time includes calculating the margin time by using the shortest amount of time, frequency of calls at a time of calculation of the shortest amount of time, and frequency of calls at current time.

10. The update processing method according to claim 1, further comprising
when it is determined that the elapsed time is equal to or less than the margin time, calling an update API corresponding to the request information after transmitting the response information stored in the memory.

11. An update processing apparatus, comprising:
a memory; and
a processor coupled to the memory and configured to:
receive request information corresponding to an update processing;
acquire, from a memory, a value of remaining items that is decreased each time when the update processing is executed;
when the value of remaining items represents that there are not remaining items, calculate a margin time indicating a period till the value of the remaining items reaches a value representing that there are not remaining items based on a frequency of calls of an application programming interface (API) used at a time of the update processing;
determine whether an elapsed time after the value of the remaining items is acquired is equal to or shorter than the margin time;
when it is determined that the elapsed time is equal to or less than the margin time, transmit response information used for a response to the request information stored in the memory back to a transmission source of the request information without waiting for a completion of execution of the update processing; and
when it is determined that the elapsed time is not equal to or less than the margin time, wait for the update processing to be completed and transmit the response information to the transmission source.

12. A non-transitory computer-readable storage medium storing a program that causes a processor included in an update processing apparatus to execute a process, the process comprising:
receiving request information corresponding to an update processing;
acquiring, from a memory, a value of remaining items that is decreased each time when the update processing is executed;
when the value of remaining items represents that there are not remaining items, calculating a margin time indicating a period till the value of the remaining items reaches a value representing that there are not remaining items based on a frequency of calls of an application programming interface (API) used at a time of the update processing;
determining whether an elapsed time after the value of the remaining items is acquired is equal to or shorter than the margin time;
when it is determined that the elapsed time is equal to or less than the margin time, transmitting response information used for a response to the request information stored in the memory back to a transmission source of the request information without waiting for a completion of execution of the update processing; and
when it is determined that the elapsed time is not equal to or less than the margin time, waiting for the update processing to be completed and transmitting the response information indicative of a result of performing the update processing back to the transmission source.

* * * * *